J. M. MARCH, DEC'D.
M. MARCH, ADMINISTRATRIX.
LOCK NUT.
APPLICATION FILED JULY 29, 1913.
1,092,155. Patented Apr. 7, 1914.
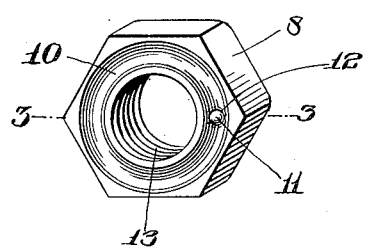
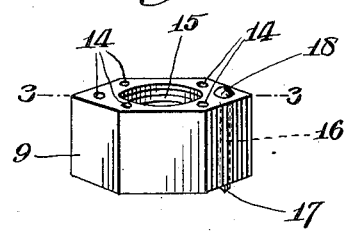
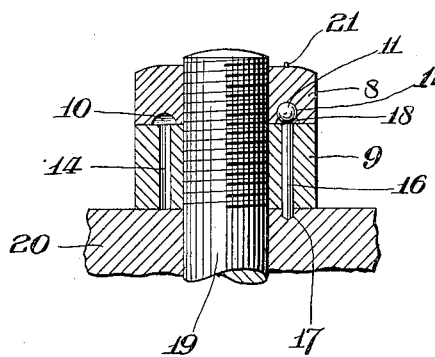
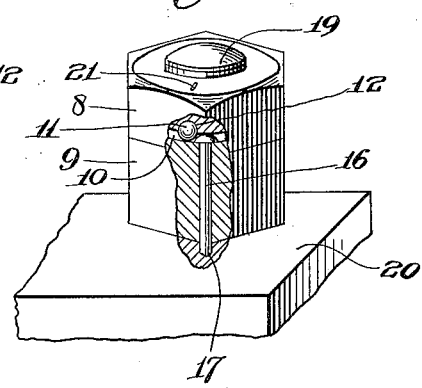

UNITED STATES PATENT OFFICE.

JACOB M. MARCH, DECEASED, LATE OF SPRING CITY BOROUGH, PENNSYLVANIA, BY MAUD MARCH, ADMINISTRATRIX, OF NEW YORK, N. Y.

LOCK-NUT.

1,092,155.  Specification of Letters Patent.  Patented Apr. 7, 1914.

Application filed July 29, 1913. Serial No. 781,753.

*To all whom it may concern:*

Be it known that JACOB M. MARCH, late a citizen of the United States, residing in the borough of Spring City, county of Chester, State of Pennsylvania, did invent new and useful Improvements in Lock-Nuts, of which the following is a specification.

The invention relates to improvements in lock nuts.

The object of the invention is to provide improved means for locking two coöperating nut elements together and also for locking said nut elements and an adjacent body to prevent relative movement therebetween.

Referring to the drawings, which illustrate merely by way of example, a suitable or one form of embodiment of my invention, Figure 1 is a perspective view of one coöperating nut element. Fig. 2 is a perspective view of the other coöperating nut element. Fig. 3 is a sectional view of the two coöperating nut elements in operative position upon a bolt and against an adjacent body; the section being in a plane corresponding to the line 3—3 of Figs. 1 and 2. Fig. 4 is a perspective view of the elements in operative or locked relationship with parts broken away to show the relation of pin and ball.

Similar numerals refer to similar parts throughout the several views.

The lock nuts comprise two coöperating elements 8 and 9. The nut element 8 is provided with the annular groove 10 surrounding the threaded opening 13 and on its face adjacent the nut element 9. A hardened ball 11 is secured in a recess or pocket 12 sunk below the bottom of groove 10 and secured therein by bringing the metal slightly over its greater periphery. The ball is however free to turn in the pocket and projects slightly above the bottom of the groove.

The nut element 9 is provided with an aperture or a number of apertures 14 extending parallel with and surrounding, where there are a number, the threaded opening 15. A pin 16 of hardened metal is adapted to project through one of the openings 14 having an especially hardened point 17. The holes 14 are so located on nut element 9 that the head 18 of the pin in whatever hole it may be placed, will register with the annular channel 10 of nut element 8. That is, the head 18 will project into channel 10 when the two nut elements are brought into coöperative relationship.

In operation, for an example, the nut element 9 is threaded on the threaded end 19 of the rod, bar or bolt, which I have shown projecting through the body 20. The nut element 9 is turned down on the threaded portion 19 until it comes into engagement with the body 20, preferably into tight engagement therewith. The pin 16 is then inserted in any one of the holes 14 which may be most suitable with respect to the conditions of the body 20 or of adjacent parts. A sharp tap with a hammer is given the head 18 to drive the point 17 into body 20. This prevents any turning of nut element 9 with respect to body portion 20. The coöperating nut element 8 is then threaded down on the threaded portion 19 until it engages with the element 9. The mark 21 on the upper face of element 8 indicates the position of the ball 11. This is noted when the two nut elements approach each other. The nut element 8 is then raised or moved away from element 9 and the pin 16 placed in the hole 14 with which the ball 11 was adjacent when the nuts were together. The nut element 8 is now returned to the coöperative position on threaded portion 19 until the ball 11 encounters the head 18 of pin 16. A forcible twist of nut element 8 now carries the ball 11 over the head 18. The ball 11 thus forms a detent with head 18 and the parts are locked securely together and will not become accidentally disengaged. That is to say, the ball 11 can only be carried back over the head 18 of pin 16, by considerable force exerted by a wrench or similar tool, in order to disengage the nuts. It also follows that the two nut elements 8 and 9 cannot turn together on threaded portion 19 away from the body 20 because of the engagement of the point 17 of pin 16 into body 20 as above described.

What I claim is:—

1. A lock nut comprising coöperating nut elements, one of said elements having a hole or recess and a pin therein having a hardened point adapted to be driven into an adjacent body to lock the nut therewith, the other nut element having a detent as means for causing locking engagement with the pin.

2. A lock nut comprising coöperating nut elements, one of said elements having a hole and a pin therein adapted to engage an adjacent body, said pin having a projecting head and the other nut element having an annular channel adapted to receive the projecting head and a ball partially sunk in the channel for engaging said projecting head as means for locking the two nut elements and the adjacent body.

3. In combination with an adjacent body, a nut having a headed pin projecting therethrough for engaging the adjacent body, a second nut having an annular channel in its coöperating face for receiving the head of the pin, and a hardened ball secured within the channel for coöperating with the head of the pin as means for locking the nut elements with the adjacent body.

4. Coöperating nut elements, one element having an annular channel in its coöperating face and a ball loosely secured and partially sunk below the channel, the other element having a pin projecting therethrough, for engaging an adjacent body, said pin provided with a head for engaging the ball.

5. Coöperating nut elements, one element having a ball loosely secured and partially sunk below the coöperating face thereof, the other element having a pin projecting therethrough for engaging an adjacent body, and a head on its coöperating face for engaging and locking with the ball.

MAUD MARCH,
*Administratrix of the estate of Jacob M. March, deceased.*

Witnesses:
GERTRUDE K. COLBY,
JESSE T. WILLIAMS.

---

Copies of this patent may be obtained for five cents each, by addressing the "Commissioner of Patents, Washington, D. C."